(12) United States Patent  
Straub, Jr. et al.

(10) Patent No.: US 7,900,338 B2
(45) Date of Patent: Mar. 8, 2011

(54) METHOD OF MAKING A TRANSDUCER HAVING A PLASTIC MATCHING LAYER

(75) Inventors: Henry Charles Straub, Jr., Sugar Land, TX (US); Randeep Singh Grewal, San Antonio, TX (US); Charles Robert Allen, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 15 days.

(21) Appl. No.: 12/477,218

(22) Filed: Jun. 3, 2009

(65) Prior Publication Data

US 2009/0235501 A1    Sep. 24, 2009

Related U.S. Application Data

(62) Division of application No. 11/746,695, filed on May 10, 2007, now Pat. No. 7,557,490.

(51) Int. Cl.
*H04R 31/00* (2006.01)

(52) U.S. Cl. ........ 29/594; 29/592.1; 29/602.1; 29/609.1; 310/333; 310/334; 310/335; 310/337; 310/357; 347/54; 347/68; 347/69; 347/70; 347/72

(58) Field of Classification Search ................. 29/592.1, 29/594, 602.1, 609.1; 310/333–337, 357, 310/367; 347/54, 68–72
See application file for complete search history.

(56) References Cited

U.S. PATENT DOCUMENTS

| | | |
|---|---|---|
| 4,297,607 A | 10/1981 | Lynnworth |
| 4,446,395 A | 5/1984 | Hadjicostis |
| 4,594,897 A | 6/1986 | Bantz |
| 5,176,140 A | 1/1993 | Kami |
| 5,737,963 A * | 4/1998 | Eckert et al. ................. 73/290 V |
| 6,038,752 A | 3/2000 | Finsterwald |
| 6,806,622 B1 | 10/2004 | Schmidt |
| 6,895,824 B2 | 5/2005 | Ehrich |
| 2007/0035211 A1 | 2/2007 | Straub, Jr. |

FOREIGN PATENT DOCUMENTS

| | | |
|---|---|---|
| JP | 5231888 A | 9/1993 |
| JP | 11-23332 A | 1/1999 |
| JP | 2006279128 A | 10/2006 |

OTHER PUBLICATIONS

PCT International Search Report and Written Opinion for International Patent Application No. PCT/US2008/062750 Filed May 6, 2008.
Office Action of Aug. 26, 2008 for U.S. Appl. No. 11/746,695 - filed May 10, 2007.
Office Action of Nov. 4, 2008 for U.S. Appl. No. 11/746,695-filed May 10, 2007.
Final Office Action of Apr. 24, 2009 for U.S. Appl. No. 11/746,695-filed May 10, 2007.
Chinese Office Action of Dec. 7, 2010-Appl. No. 200880015465.7.

* cited by examiner

*Primary Examiner* — Paul D Kim
(74) *Attorney, Agent, or Firm* — Mark E. Scott; Conley Rose, P.C.

(57) ABSTRACT

Making a transducer having a plastic matching layer which includes providing a transducer housing having a proximal end and a distal end, and bonding a plastic to the distal end of the transducer housing (the plastic fluidly sealing and occluding the distal end). The bonding further includes inserting a cylinder comprising a mold-release chemical into the transducer housing, bonding plastic onto the distal end of the transducer housing, and removing the cylinder when the plastic has hardened.

9 Claims, 5 Drawing Sheets

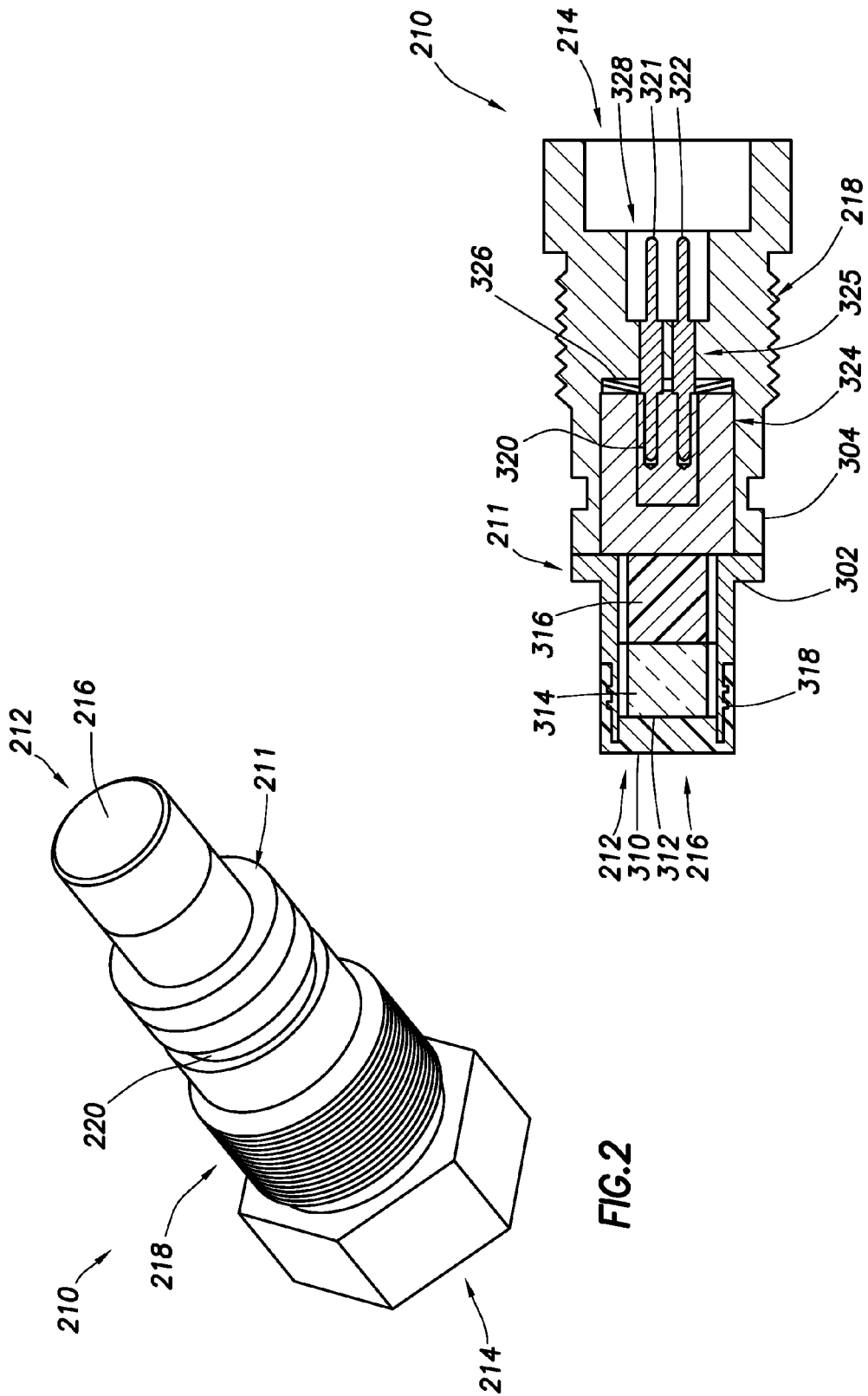

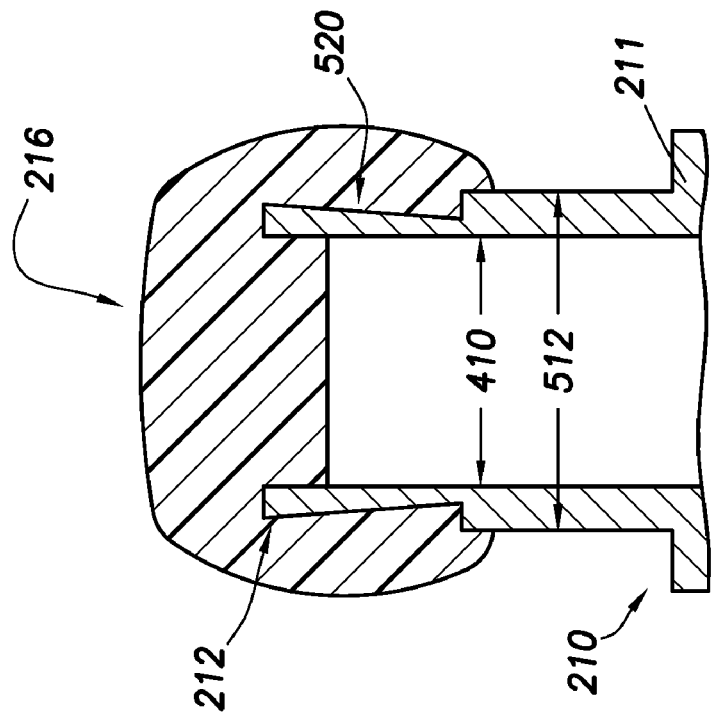
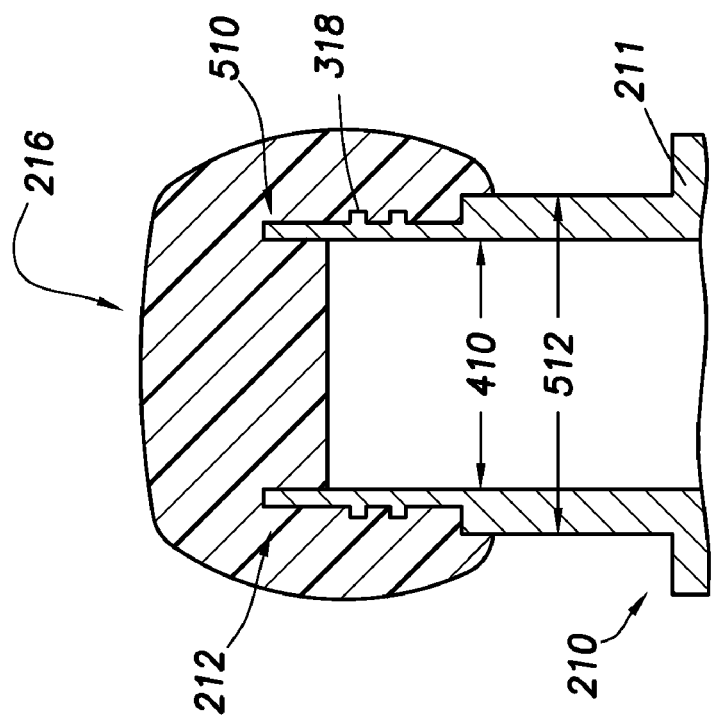

METHOD OF MAKING A TRANSDUCER HAVING A PLASTIC MATCHING LAYER

CROSS-REFERENCE TO RELATED APPLICATIONS

This application is a divisional of application Ser. No. 11/746,695 filed May 10, 2007 titled "Systems and methods of a transducer having a plastic matching layer," now U.S. Pat. No. 7,557,490, and which is incorporated by reference as if reproduced in full below.

BACKGROUND

1. Field

The various embodiments relate to ultrasonic flow meters and particularly to transducers used in ultrasonic meters.

2. Description of the Related Art

After hydrocarbons have been removed from the ground, the fluid stream (either in a liquid phase or a gaseous phase) is transported from place to place via pipelines. It is desirable to know with accuracy the amount of fluid flowing in the stream, and particular accuracy is demanded when the fluid is changing hands, or "custody transfer." Even where custody transfer is not taking place, however, measurement accuracy is desirable, and in these situations ultrasonic flow meters may be used. In an ultrasonic flow meter, ultrasonic signals are sent back and forth across the fluid stream to be measured, and based on various characteristics of the ultrasonic signals a fluid flow may be calculated. Mechanisms which improve the quality of the ultrasonic signals imparted to the fluid may improve measurement accuracy. Moreover, wear and tear (e.g., caused by the corrosivity of the fluid being measured) on the components of the meter can substantially decrease longevity of the device, and thus any method to increase the durability of the meter and its components would be desirable. Finally, ultrasonic flow meters may be installed in harsh environments, and thus any mechanism to reduce maintenance time, and if possible improve performance, would be desirable.

SUMMARY

The various embodiments are directed to systems and methods of a transducer having a plastic matching layer. At least some of the illustrative embodiments are transducers comprising a housing (having a proximal end, a distal end and an internal volume, the housing configured to couple to a spoolpiece of an ultrasonic meter), a plastic matching layer that has an external surface and an internal surface (the plastic matching layer seals to and occludes the distal end of the housing), and a transducer element abutting the internal surface of the plastic matching layer.

Other illustrative embodiments are ultrasonic meters comprising a spoolpiece having an internal flow path for a measured fluid, and a transducer in operational relationship to the spoolpiece. The transducer further comprises a housing that defines an internal volume, a plastic matching layer that separates the internal volume of the housing from the measured fluid (wherein the plastic matching layer has an acoustic impedance between that of a piezoelectric crystal and the measured fluid), and a transducer element abutting an internal surface of the plastic matching layer.

Yet still other illustrative embodiments are methods comprising generating an ultrasonic signal, propagating the ultrasonic signal through a plastic matching layer, and imparting the acoustic signal to a fluid within an ultrasonic meter.

Finally, other embodiments are methods comprising providing a transducer housing having a proximal end and a distal end, bonding a plastic to the distal end of the transducer housing (the plastic fluidly sealing and occluding the distal end). The bonding further comprises inserting a cylinder at least partially coated with a mold-release chemical into the transducer housing, bonding plastic onto the distal end of the transducer housing, and removing the cylinder when the plastic has hardened.

BRIEF DESCRIPTION OF THE DRAWINGS

For a more detailed description of embodiments, reference will now be made to the accompanying drawings, in which:

FIG. 2 is a perspective view of a transducer in accordance with various embodiments;

FIG. 3 is a cross-sectional elevation view of a transducer in accordance with various embodiments;

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

"Fluid" shall mean a liquid (e.g., crude oil or gasoline) or a gas (e.g., methane).

DETAILED DESCRIPTION

Figure 1A:
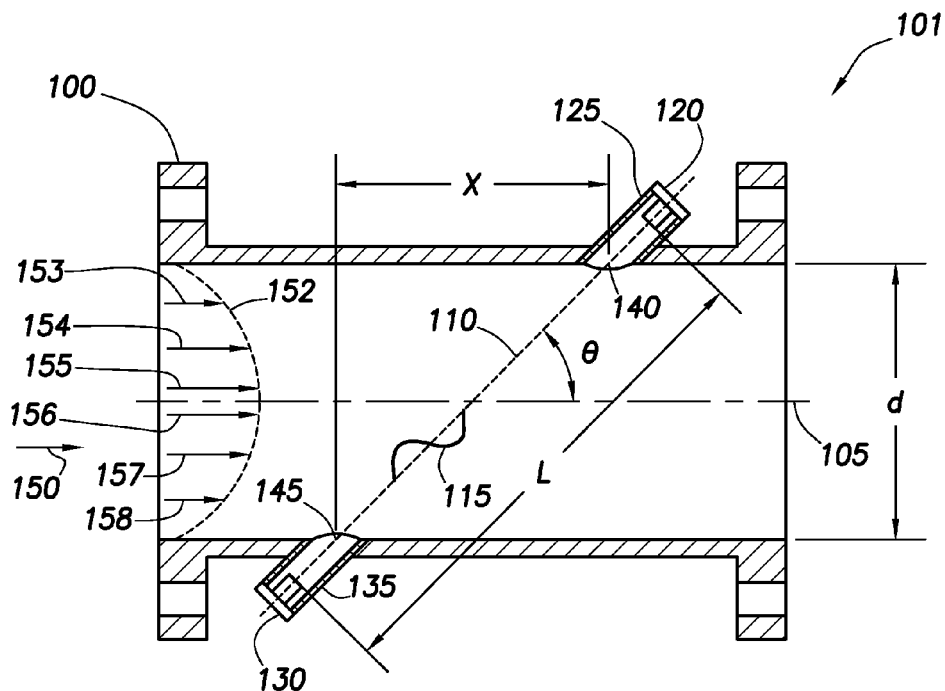
FIG. 1A is an elevational cross-sectional view of an ultrasonic flow meter.

FIG. 1A is a cross-sectional elevation view of an ultrasonic meter 101 in accordance with various embodiments. Spoolpiece 100, suitable for placement between sections of a pipeline, is the housing for the meter 101. The spoolpiece 100 has an internal volume that is a flow path for a measured fluid and also has a predetermined size that defines a measurement section within the meter. A fluid may flow in a direction 150 with a velocity profile 152. Velocity vectors 153-158 illustrate that the fluid velocity through spoolpiece 100 increases toward the center.

Transducers 120 and 130 are located on the circumference of the spoolpiece 100. The transducers 120 and 130 are accommodated by transducer ports 125 and 135, respectively. The position of transducers 120 and 130 may be defined by the angle θ, a first length L measured between transducers 120 and 130, a second length X corresponding to the axial distance between points 140 and 145, and a third length "d" corresponding to the pipe diameter. In most cases distances d, X and L are precisely determined during meter fabrication. Further, transducers such as 120 and 130 may be placed at a specific distance from points 140 and 145, respectively, regardless of meter size (i.e. spoolpiece size). Although the transducers are illustrated to be recessed slightly, in alternative embodiments the transducers protrude into the spoolpiece.

A path 110, sometimes referred to as a "chord," exists between transducers 120 and 130 at an angle θ to a centerline 105. The length L of "chord" 110 is the distance between the face of transducer 120 and the face of transducer 130. Points 140 and 145 define the locations where acoustic signals generated by transducers 120 and 130 enter and leave fluid flowing through the spoolpiece 100 (i.e. the entrance to the spoolpiece bore).

Transducers 120 and 130 are preferably ultrasonic transceivers, meaning that they both generate and receive ultrasonic signals. "Ultrasonic" in this context refers to frequencies above about 20 kilohertz. To generate an ultrasonic signal, a piezoelectric element is stimulated electrically, and it responds by vibrating. The vibration of the piezoelectric element generates an ultrasonic signal that travels through the fluid across the spoolpiece to the corresponding transducer of the transducer pair. Similarly, upon being struck by an ultrasonic signal, the receiving piezoelectric element vibrates and generates an electrical signal that is detected, digitized, and analyzed by electronics associated with the meter. Initially, downstream transducer 120 generates an ultrasonic signal that is then received by upstream transducer 130. Some time later, the upstream transducer 130 generates a return ultrasonic signal that is subsequently received by the downstream transducer 120. Thus, the transducers 120 and 130 play "pitch and catch" with ultrasonic signals 115 along chordal path 110. During operation, this sequence may occur thousands of times per minute.

The transit time of the ultrasonic signal 115 between transducers 120 and 130 depends in part upon whether the ultrasonic signal 115 is traveling upstream or downstream with respect to the fluid flow. The transit time for an ultrasonic signal traveling downstream (i.e. in the same direction as the flow) is less than transit time when traveling upstream (i.e. against the flow). The upstream and downstream transit times can be used to calculate the average flow velocity along the signal path, and may also be used to calculate the speed of sound in the fluid. Knowing the cross-sectional area of the meter carrying the fluid and assuming the shape of the velocity profile, the average flow velocity over the area of the meter bore may be used to find the volume of fluid flowing through the meter 101.

Figure 1B:
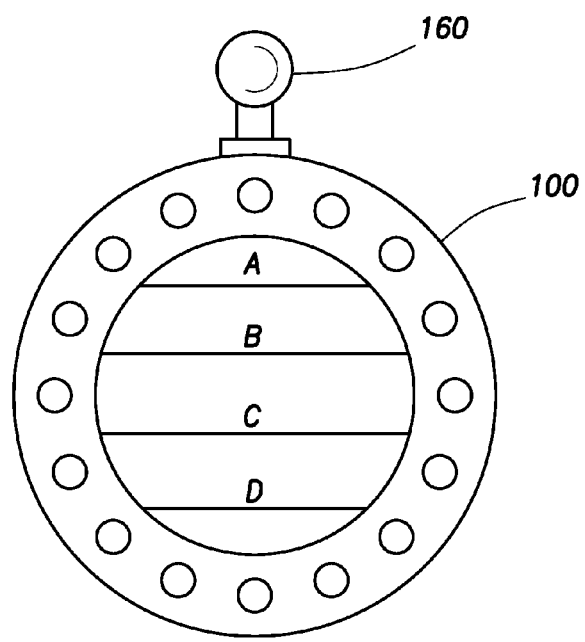
FIG. 1B is an elevational end view of a spoolpiece which illustrates chordal paths A, B, C and D.

Ultrasonic flow meters can have one or more pairs of transducers corresponding to one or more paths. FIG. 1B is an elevation end-view of a spoolpiece 100. In these embodiments, spoolpiece 100 comprises four chordal paths A, B, C, and D at varying levels through the fluid flow. Each chordal path A-D corresponds to two transducers behaving alternately as a transmitter and receiver. Also shown are control electronics 160, which acquire and process data from the four chordal paths A-D. Hidden from view in FIG. 1B are the four pairs of transducers that correspond to chordal paths A-D.

Figure 1C:
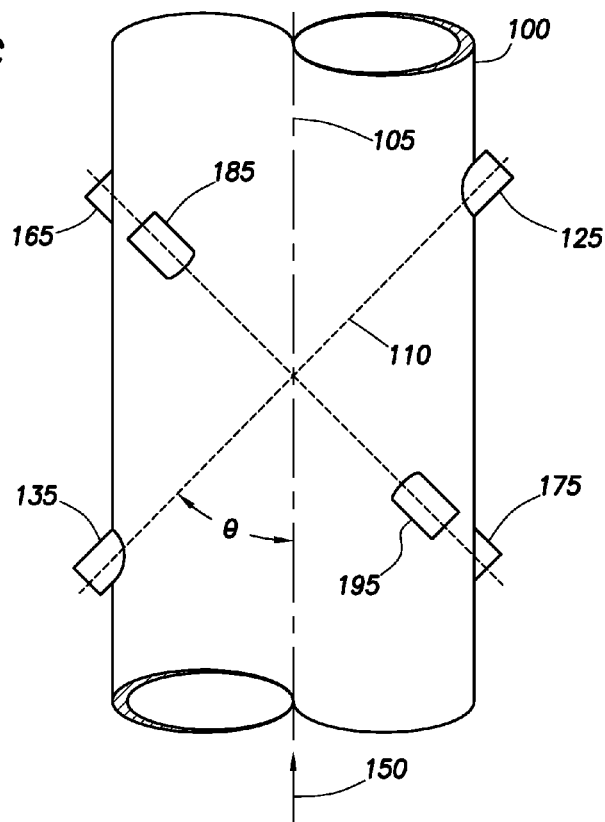
FIG. 1C is a top view of a spoolpiece housing transducer pairs.

An arrangement of the four pairs of transducers may be further understood by reference to FIG. 1C, showing spool piece 100 and flow direction 150. Each pair of transducer ports corresponds to a single chordal path of FIG. 1B. A first pair of transducer ports 125 and 135, mounted at a non-perpendicular angle θ to centerline 105 of spool piece 100, houses transducers 120 and 130 (FIG. 1A). Another pair of transducer ports 165 and 175 (only partially in view) houses associated transducers so that the chordal path loosely forms an "X" with respect to the chordal path of transducer ports 125 and 135. Similarly, transducer ports 185 and 195 may be placed parallel to transducer ports 165 and 175 but at a different "level" (i.e. a different elevation in the spoolpiece). Not explicitly shown in FIG. 1C is a fourth pair of transducers and transducer ports. Taking FIGS. 1B and 1C together, the pairs of transducers are arranged such that the upper two pairs of transducers corresponding to chords A and B, and the lower two pairs of transducers corresponding to chords C and D. The flow velocity of the fluid may be determined at each chord A-D to obtain chordal flow velocities, and the chordal flow velocities combine to determine an average flow velocity over the entire pipe. Although four pairs of transducers are shown forming an X shape, there may be more or less than four pairs. Also, the transducers could be in the same plane or in some other configuration.

FIG. 2 is a perspective view of a transducer 210 in accordance with various embodiments. The transducer 210 comprises a cylindrical housing 211, which in some embodiments is metal (e.g., low carbon stainless steel). In alternative embodiments, any material capable of withstanding the pressure of the fluid within the meter, such as high density plastics or composite materials, may be equivalently used. The transducer 210 comprises a distal end 212 and a proximal end 214. The distal end 212 is occluded and sealed by a plastic matching layer 216. Threads 218 on the outside diameter of the transducer housing 210 near the proximal end 214 enable the transducer 210 to be coupled to the spoolpiece 100 (FIGS. 1A-C), and an o-ring with groove 220 seals the transducer 210 to the transducer port (FIGS. 1A-C). In alternative embodiments, the transducer 210 is welded to the transducer port (FIGS. 1A-C) of the spoolpiece, and thus the threads 218 and grove 220 may be omitted.

FIG. 3 is a cross-sectional elevation view of a transducer 210 in accordance with various embodiments. In particular, the housing 211, may, in some embodiments, comprise two individual components. For example, the distal end 212 of the transducer 210 may comprise a first cylindrical outer housing 302, and the proximal end 214 may comprise a second cylindrical outer housing 304 (comprising the threads 218), where the two housings 302, 304 are bonded together as part of the construction process. In alternative embodiments, the cylindrical outer housing 211 may comprise a single piece structure, where the various components are installed through one end.

The plastic matching layer 216 occludes the distal end 212 and defines an exterior surface 310 and an interior surface 312. More particularly, the housing 211 defines a circumference around which the plastic matching layer 216 is molded. In some embodiments, the housing 211 comprises circumferential bonding ridges 318 to which the plastic bonds. In alternative embodiments, the housing 211 comprises circumferential bonding grooves (FIG. 5), again to which the plastic bonds. The exterior surface 310 of the plastic matching layer 216 is exposed to fluids flowing through the spoolpiece/meter (FIGS. 1A-C), and the interior surface 312 abuts a transducer element 314 (e.g., a piezoelectric element). The volume behind the transducer element 314 comprises a back matching layer 316 and back matching support layer 324. The back matching layer 316 may be, for example, plastic, metal, glass, ceramic, epoxy, powder-filled epoxy, rubber, or powder-filled rubber. In some embodiments, the transducer element 314 is biased towards the plastic matching layer 216 by way of a conic washer 326, but any biasing system (e.g., coil springs) may be equivalently used. Biasing the transducer element 314 toward the plastic matching layer 216 helps ensure good acoustic coupling of the transducer element 314 to the plastic matching layer 216, and further provides structural support for the plastic matching layer 216 by reducing inward deflection of the plastic matching layer caused by high fluid pressures within the meter.

Still referring to FIG. 3, on the proximal end 214 of the housing 211 is a pin recess 328 within which resides two connection pins 321 and 322. The two connection pins 321, 322 are arranged at the desired spacing and exposed to enable the pins to couple to the external electronics of the meter by way of a cable. Interior of the transducer 210 the pins mate with the connector 320 within the back matching support layer 324, which connector 320 provides an electrical coupling of the pins 321, 322 to the transducer element 314. In some embodiments, the pins 321, 322 seal to the housing 211 (in area 325), such as by a glass-to-metal seal. The sealing of the pins 321, 322 along with the seal provided by the plastic matching layer 216 isolates the internal components of the transducer 210 both from the fluid and meter and atmosphere. In the event the seal provided by the plastic matching layer fails, the sealing of the pins 321, 322 reduces the possibility of escape of fluid in the meter through the transducer. The level of protection provided by sealing the pins against escape of the fluid through the transducer is particularly important in situations where the fluid in the meter contains poisonous substances (e.g., the fluid is a hydrocarbon stream containing hydrogen sulfide).

In addition to sealing an interior volume of the transducer 210 from fluids in the meter, the plastic matching layer 216 provides acoustical coupling between the transducer element 314 and fluid in the meter. In accordance with the various embodiments, the plastic matching layer has acoustic impedance between that of the transducer element 314 and fluid in the meter. With the acoustic impedance of the matching layer between that of the transducer element and the fluid in the meter, the quality of the ultrasonic signal is improved (e.g., larger amplitude and faster rise time). In some embodiments the plastic matching layer 216 is thermoplastic, which is corrosion resistance. Depending on the pressure to which the transducer 210 will be exposed and the characteristics of the fluid in the meter (e.g., how corrosive), other plastics may be equivalently used. Plastic matching layers have the desired acoustic impedance to provide good acoustic coupling while being strong enough to resist the pressure of the fluid within the meter so that the transducer element can be isolated from the fluid in the within the meter. In some embodiments, the acoustic impedance of the plastic matching layer 216 is between about 1 and about 30 Mega-rayl (MRayl), and particularly between about 2 and about 4 MRayl. Comparatively, the acoustic impedance of a matching layer comprising substantially stainless steel is more than the acoustic impedance of the piezoelectric element, and therefore provides poor acoustic coupling.

The plastic matching layer 216 has a thickness (along an axis shared with the remaining portions of the housing 211) that in some embodiments is substantially equal to an odd multiple of one-quarter (¼, ¾, ⅝, ⅞, etc.) wavelength of the sound generated by the transducer element 314. For example, consider a transducer element 314 operating at a frequency of 125 kHz and a plastic matching layer 216 with a speed of sound of 2,500 m/s. The wavelength of the sound in the matching layer is approximately 0.788 inches. In these embodiments the plastic matching layer may be 0.197, 0.590, 0.984, 1.378 and so on, inches thick. A thinner plastic matching layer gives better acoustical performance, but making the plastic matching layer thicker enables the transducer 210 to withstand higher pressures. Picking the optimal matching layer thickness involves choosing the thinnest matching layer that can hold the highest pressures expected inside the meter.

Figure 4:
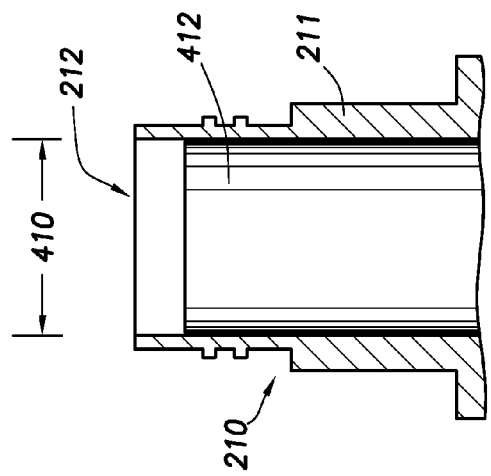
FIG. 4 is a cross-sectional elevation view of a transducer with interior structures not present and prior to molding of the plastic.

The discussion now turns to various embodiments of constructing a transducer 210 having a plastic matching layer. In particular, FIG. 4 is a cross-sectional elevation view of a portion of housing 211, with interior structures not present and prior to molding of the plastic to create the plastic matching layer. Before the plastic matching layer is applied, a telescoping cylinder 412 having a outside diameter slightly smaller than the inside diameter 410 of the housing 211 is inserted into the housing 211. The telescoping cylinder 412 is at least partially coated with a mold release chemical to facilitate the removal of the cylinder after the plastic matching layer has hardened. In some embodiments (and as shown in FIG. 4), the end of the telescoping cylinder is recessed slightly from the distal end 212 of the housing 211, enabling the plastic to partially fill an interior volume of the housing 211. In alternative embodiments, the cylinder 412 maybe positioned such that the end of the cylinder 412 and the distal end of the housing 211 form a plane, and thus when formed the plastic of the plastic matching layer will not extend any appreciable distance into the interior volume of housing 211.

Figure 5A:
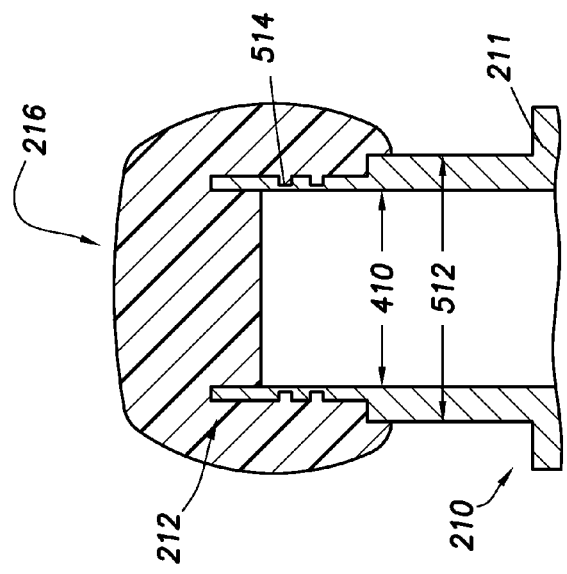
FIG. 5 (comprising FIGS. 5A, 5B and 5C) is a cross-sectional elevation view of a transducer after a plastic matching layer has been molded to the distal end.

After placing cylinder 412, the plastic is molded to the distal end of the housing 211. In particular, the plastic matching layer is molded onto the housing at high temperature. In some embodiments, the plastic of the plastic matching layer has a coefficient of thermal expansion greater than that of the housing. As the plastic matching layer cools, it contracts more than the housing, thus forming a hermetic seal on at least the outside diameter of the housing. FIG. 5 (comprising FIGS. 5A, 5B and 5C) is a cross-sectional elevation view of a transducer 211 after the plastic has been applied to the distal end 212 and the telescoping cylinder 412 has been removed. In particular, in some embodiments the plastic is set in a mold having an inside diameter larger than the outside diameter 512 of the housing 211. As the plastic cools and shrinks the plastic bonds to the housing 211. Although in some embodiments the plastic may bond to a smooth surface on the outside diameter of the housing 211, in other embodiments the bonding of the plastic is aided by features on the outside diameter of the housing. FIG. 5A illustrates the plastic bonding to circumferential bonding grooves 514. FIG. 5B illustrates the plastic bonding to circumferential bonding ridges 318. FIG. 5C illustrates the plastic bonding to a tapered distal end 520 of the hosing 211. Moreover, the grooves, ridges and tapers need not be mutually exclusive, and may be combined in any combination (e.g., tapered with bonding grooves, tapered with bonding ridges). As illustrated, the plastic matching layer 510 occludes and seals the distal end 212 of the housing 211.

Figure 6:
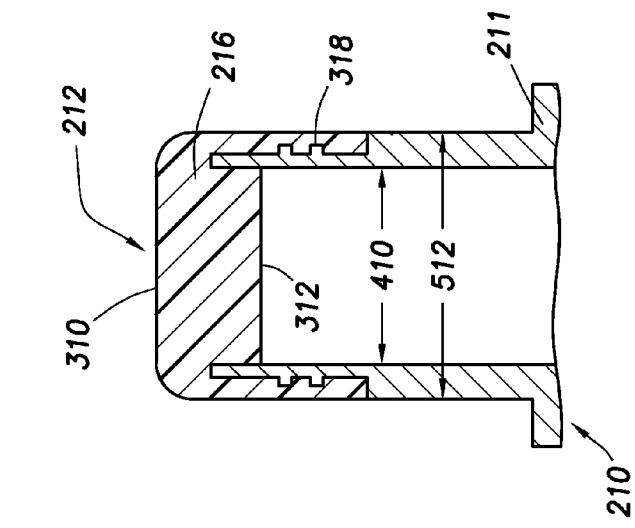
FIG. 6 is a cross-sectional elevation view of a transducer after a plastic matching layer has been machined.

After rough forming of the plastic of the matching layer to encompass the distal end of the housing 211, the plastic is machined to its final form. FIG. 6 is a cross-sectional elevation view of a transducer 210 after machining of the plastic, and comprising illustrative circumferential bonding ridges 318. In some embodiments, the plastic matching layer 216 is machined to have an outside diameter substantially equal to the outside diameter 512 of the housing 211. In the area delimited by the inner diameter 410 of the housing 211, the interior surface 312 and the exterior surface 310 are substantially flat and parallel.

Figure 7:
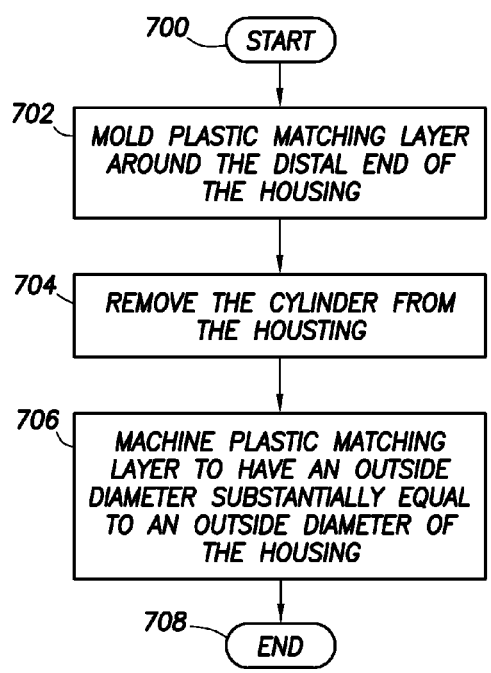
FIG. 7 is a flow diagram in accordance with various embodiments of the invention.

FIG. 7 is a flow diagram of construction of a transducer in accordance with at least some embodiments. In particular, the method starts (block 700) and the plastic matching layer is molded around the distal end of the housing (block 702). In some embodiments, molding the plastic matching layer around the distal end of the housing comprises inserting a cylinder within the housing, and then molding the plastic matching layer around the distal end of the housing. The cylinder within the housing controls the depth at which the plastic matching layer protrudes into the interior volume of the housing. After the plastic matching layer has hardened, the cylinder may be removed from the housing (block 704). In embodiments where the plastic is molded to an outside diameter larger than the outside diameter of the housing, the plastic is machined to have an outside diameter substantially equal to an outside diameter of the housing (block 706), and the illustrative method ends (block 708).

Figure 8:
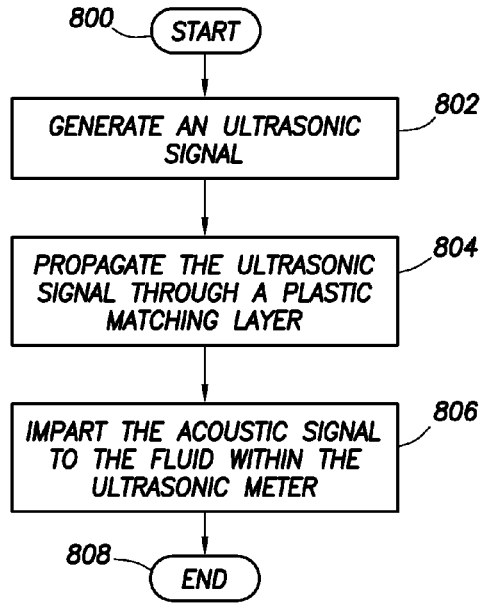
FIG. 8 is a flow diagram in accordance with various embodiments.

FIG. 8 is a flow diagram in accordance with at least some embodiments. In particular, the method starts (block 800) and an ultrasonic signal is generated (block 802) by way of the transducer. The ultrasonic signal is propagated through the plastic matching layer (block 804) and imparted to the fluid traveling through the meter (block 806). Thereafter, the illustrative method ends (block 808).

The above discussion is meant to be illustrative of the principles and various embodiments of the present invention. Numerous variations and modifications will become apparent to those skilled in the art once the above disclosure is fully appreciated. For example, in molding the plastic matching layer to encompass the distal end of the housing, a cylinder need not be used; rather, the plastic may be allowed to free-flow into the interior volume of the housing, an then the excess may be machined away. Further still, in embodiments where a cylinder is used to limit flow of the plastic into the interior volume during molding, the cylinder need not specifically define interior surface. The plastic may be allowed to flow into the interior volume beyond that desired, and then machine away to define the interior surface. Moreover, while the various embodiments are discussed in terms of molding the plastic matching layer to initial have a larger outside diameter than the housing and machining the plastic matching layer, in other embodiments the plastic matching layer may be molded to have an outside diameter approximately the same such that no machining with respect to outside diameter is needed; however, the exterior face 310 may be machined to ensure a smooth surface, and a surface substantially parallel to the interior surface 312. It is intended that the following claims be interpreted to embrace all such variations and modifications.

What is claimed is:

1. A method comprising:
   providing a transducer housing having a proximal end and a distal end; and
   bonding a plastic to the distal end of the transducer housing, the plastic fluidly sealing and occluding the distal end; wherein bonding further comprises:
   inserting a cylinder comprising a mold-release chemical into the transducer housing;
   bonding the plastic onto the distal end of the transducer housing; and
   removing the cylinder when the plastic has hardened.

2. The method as defined in claim 1 wherein bonding further comprises bonding the plastic to a circumferential ridge on the external surface of the transducer housing proximate to the distal end.

3. The method as defined in claim 1 wherein bonding further comprises bonding the plastic to a circumferential groove on the external surface of the transducer housing proximate to the distal end.

4. The method as defined in claim 1 wherein bonding further comprises bonding the plastic to a taper on the external surface of the transducer housing proximate to the distal end.

5. The method as defined in claim 1 wherein bonding further comprises bonding the plastic having a coefficient of thermal expansion greater than that of the transducer housing.

6. The method as defined in claim 1 wherein the plastic resides external of an internal volume defined by the transducer housing.

7. The method as defined in claim 1 wherein bonding further comprises setting the plastic in a mold having an inside diameter greater than an outside diameter of the transducer housing.

8. The method as defined in claim 7 further comprising machining the plastic to the same outer diameter as the transducer housing.

9. The method as defined in claim 1 wherein bonding further comprises setting the plastic in a mold having an inside diameter substantially the same as an outside diameter of the transducer housing.

\* \* \* \* \*